UNITED STATES PATENT OFFICE.

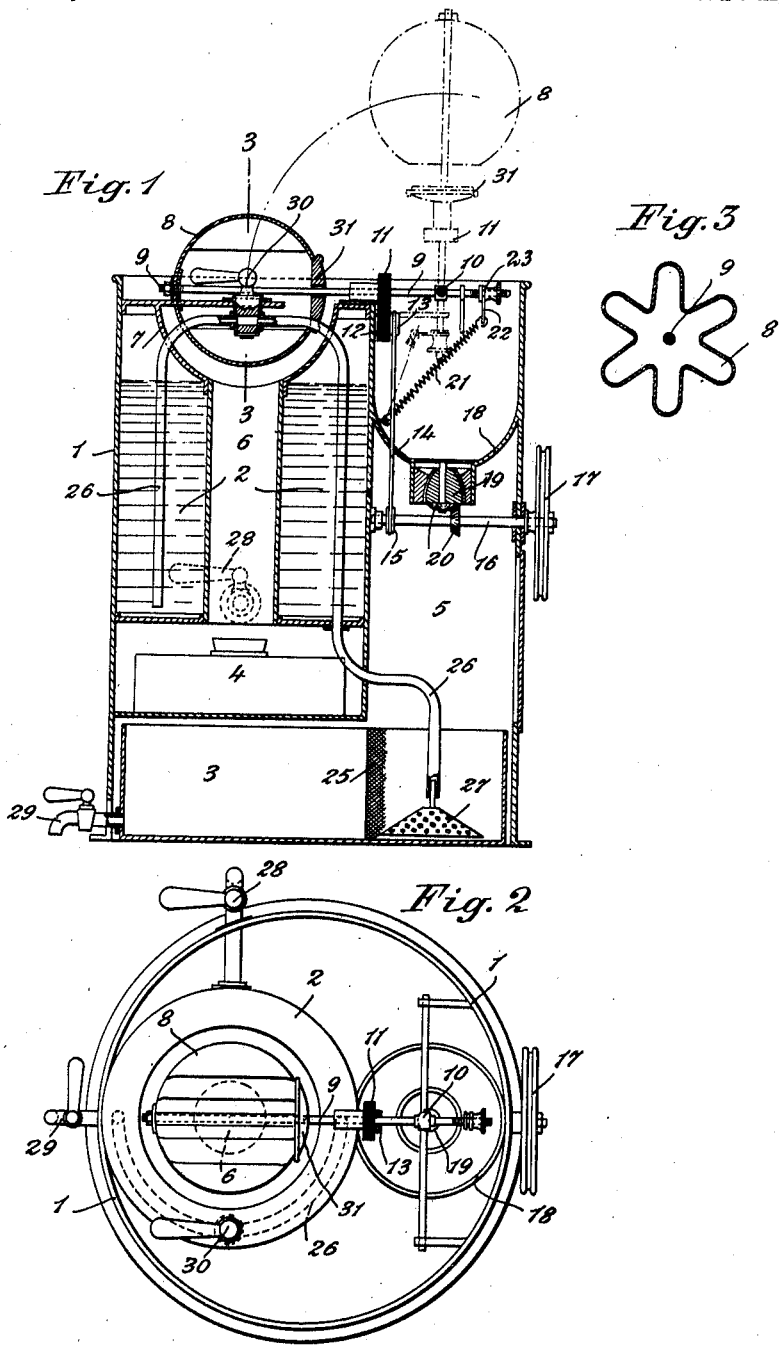

VINCENZO CAPPELLI, OF ROME, ITALY.

APPARATUS FOR ROASTING AND PREPARING COFFEE IN CUPS.

1,345,477.  Specification of Letters Patent.  Patented July 6, 1920.

Application filed January 2, 1919. Serial No. 269,352.

*To all whom it may concern:*

Be it known that I, VINCENZO CAPPELLI, a subject of the King of Italy, and residing at Rome, Italy, (whose post-office address is Via degli Equi 56, Rome,) have invented a certain new and useful Apparatus for Roasting and Preparing Coffee in Cups, of which the following is a specification.

This invention relates to coffee making machines of that type wherein a coffee beverage is prepared from fresh coffee beans which are roasted and ground in the machine and boiling water is led to the ground coffee in a brewer from a boiler which is heated by the burner employed for roasting the coffee, the roaster and the grinder being driven from one common source of energy and means are provided to transfer the roasted coffee beans from the roaster to the grinder.

One of the objects of the invention is to provide simple means for establishing the communication between the roaster and the grinder when the coffee has been properly roasted.

Another object of the invention is to provide simpler and more reliable means for driving the roaster and grinder from the same source of energy.

Other objects of the invention will appear from the following specification in which a constructional form of the apparatus is described with reference to the accompanying drawing in which—

Figure 1 is a cross sectional view of one constructional form,

Fig. 2 is a plan view thereof, and

Fig. 3 is a sectional detail view on line 3—3 of Fig. 1.

Referring to the drawing, 1 indicates a metal casing which incloses a water reservoir 2 on one side, a brewer 3 at its bottom and a heating device 4 below the boiler, the space 5 beside the boiler being arranged to receive the grinder and the driving means as hereafter described.

The boiler 2 has a tubular flue 6 passing through it above the heating device 4 so that the hot gases from the heating device may pass through this flue and heat the water and be conducted by a concave plate 7 on the top of the boiler around a roaster 8, a space being left for this purpose between the concave plate 7 and the spherical roaster 8 which is preferably of star-shape in cross-section (Fig. 3) so as to provide a larger heating surface.

The roaster 8 is mounted on a horizontally arranged shaft 9 which is supported in a bearing 10. This bearing is mounted so that the shaft can be swung into a position at right angles respecting the axis of rotation of the shaft 9. The shaft 9 has mounted on it a gear 11 which meshes with a smaller gear 12 secured to the wall of the boiler and formed integrally with a pulley 13 which is connected by means of a belt or the like 14 with a pulley 15 mounted on a shaft 16. This shaft projects outside the casing 1 and carries a wheel 17 on its projecting end, which said wheel may have a rotary motion imparted to it in any desired or appropriate way.

In the upper part of the space 5 is arranged a hopper 18 above a grinder 19. The shaft of the grinder 19 is connected by means of a bevel gearing 20 with the shaft 16.

A spiral spring 21 is secured at one end to the wall of the boiler, while its other end is connected by means of a lug 22 with a nut 23 which is screwed onto the threaded outside end of the shaft 9. The nut 23 serves to regulate the tension of the spring and is connected with the lug 22 in such a manner as to be able to rotate together with the shaft 9.

The brewer 3 at the bottom of the casing 1 is divided into two compartments by a wire net 25. A bent tube 26 connects the bottom of one compartment with the water boiler 2 and is provided within the infusing device with a conical strainer 27. 28 is a tap for the boiler and 29 a tap for the brewer to pour out the coffee beverage, while 30 is a cock on the tube 26 to open or close the communication between the boiler 2 and the brewer 3. The roaster is provided with a shutter 31 arranged to slide along shaft 9.

The apparatus works in the following way:

The raw coffee beans are put into the roaster through the shutter 31, the boiler is filled with a suitable quantity of water and the heating device 4 is lighted. The wheel 17 is then made to rotate and this rotation will be transmitted through the shaft 16 to the gearing 20 which drives the grinder, and through the belt 14 and the gearing 13, 12, 11 to the shaft 9 and to the roaster.

The coffee will thus be evenly roasted and the water be made to boil.

When the coffee has been sufficiently roasted and has lost a part of its weight during this roasting process, the spring 21 ceases to be balanced by the weight of the coffee and thus causes the shaft 9 to swing about its pivot together with the roaster. The roaster takes up the position shown in dotted lines, the cover 31 slides along the shaft 9 and the roasted coffee beans are allowed to fall through the hopper 18 into the grinder 19 where they are ground. The ground coffee falls into the brewer 3.

During this time the water has been brought to boiling point and the boiling water is forced by the steam pressure from the boiler through the tube 26 and the open cock 30 into the brewer 3, where the beverage is prepared. The beverage is sifted by the strainer 25 and may be drawn off through the cock 29.

When the burner 4 has been spent, the vapor within the boiler 2 will condense and the vacuum thus produced will cause the coffee drink 2 to be sucked up into the boiler 2 where it may be kept hot by lighting again the burner 4 and from which it may be drawn off through the tap 28 when desired.

What I claim is:

In a coffee making machine, an inclosing case, an oscillating roaster, a grinder, a water boiler, a brewer, means for driving the roaster and the grinder from the same source of energy, a burner to heat the roaster and the water boiler, a tube to conduct the boiling water from the boiler to the brewer, and a device to bring the roaster into horizontal position above the grinder to discharge its contents into the grinder, this device comprising a spiral spring arranged to draw the roaster upward when the coffee has lost part of its weight during the roasting process, and means to regulate the tension of the spring.

In testimony whereof I have hereunto signed my name in the presence of two witnesses.

VINCENZO CAPPELLI.

Witnesses:
  A. Pizzoevlo,
  Juy Smedesó Anboin.